United States Patent [19]

Lechner et al.

[11] 3,925,087
[45] Dec. 9, 1975

[54] CORROSION INHIBITION OR PREVENTION WITH INORGANIC-ORGANIC COMPLEXES

[75] Inventors: Thomas G. Lechner, Lake Elmo; Michael E. Besse, Eagan, both of Minn.

[73] Assignee: Economics Laboratory, Inc., St. Paul, Minn.

[22] Filed: Apr. 4, 1974

[21] Appl. No.: 457,708

[52] U.S. Cl. .................. 106/14; 106/119; 106/247; 106/251; 106/260; 106/265; 106/267; 106/285; 252/33; 252/395
[51] Int. Cl.². C08L 91/00; C09D 3/26; C09D 5/08
[58] Field of Search .......... 106/14, 109, 111, 116, 106/119, 249, 250, 251, 260, 262, 265, 267, 285; 252/33, 395

[56] References Cited
UNITED STATES PATENTS

| | | | |
|---|---|---|---|
| 2,421,672 | 6/1947 | Wilson et al. | 106/14 |
| 2,671,758 | 3/1954 | Rubin et al. | 106/260 X |
| 3,035,926 | 5/1962 | Larrieu | 106/14 |
| 3,086,871 | 4/1963 | Sheldahl et al. | 106/14 |
| 3,242,080 | 3/1966 | Wiley et al. | 252/33 |
| 3,377,283 | 4/1968 | McMillen | 106/14 X |
| 3,565,672 | 2/1971 | Adams | 252/33 X |
| 3,746,643 | 7/1973 | Rogers | 106/14 X |
| 3,746,643 | 7/1973 | Rogers | 252/33 |
| 3,816,310 | 6/1974 | Hunt | 252/33 X |

*Primary Examiner*—Joan E. Welcome
*Attorney, Agent, or Firm*—Thomas M. Meshbesher

[57] ABSTRACT

In the disclosed compositions, about 2 to about 10% by weight of a drying oil in combination with a conventional rust-inhibiting thixotropic inorganic-organic complex in the appropriate concentration provides a corrosion inhibiting film with a degree of resistance to saltspray not possessed by either the inorganic-organic complex or the drying oil alone. A preferred composition comprises 12.5 to 25% by weight of a calcium sulfonate/calcium carbonate concentrate and 3 – 9% by weight of tung oil, essentially the balance of the composition being a high-boiling hydrocarbon oil (e.g. paraffinic or naphthenic oil). The inorganic-organic complex concentrate typically comprises a stable dispersion of the complex in 65 – 100 parts per hundred of a hydrocarbon oil which can be the same as or different from the aforementioned balance of the composition. These compositions are particularly well-suited to flotation coating of ballast tanks.

16 Claims, No Drawings

CORROSION INHIBITION OR PREVENTION WITH INORGANIC-ORGANIC COMPLEXES

FIELD OF THE INVENTION

This invention relates to corrosion inhibiting compositions, i.e. compositions for coating both ferrous and non-ferrous metals to protect such metals from the formation of rust or other types of corrosion. An aspect of this invention relates to formulating and applying corrosion-inhibiting compositions containing a dispersion of an inorganic-organic complex in oil. The complex is a known type of compound which is very polar and forms excellent bonds with ferrous and non-ferrous metals. The crystalline structure of the inorganic portion of the complex is platelet in character, which allows "fish scaling" of crystals to provide films with very low moisture vapor transmission rates.

DESCRIPTION OF THE PRIOR ART

Many materials which are abundant in the environment can cause corrosion of metals. For example, water, air, inorganic metal salts, and the like, alone and in combination, can attack and corrode ferrous metals and non-ferrous metals such as aluminum. One of the commonest approaches to the prevention or inhibition of corrosion is to coat the metal surface with an organic material, thereby placing a barrier between the metal surface and the environment. If the metal never has to be repaired or welded, the organic material could be a permanent coating such as a cured resin. However, a cured resin coating would be impractical in many situations, e.g. the interior of ship ballast tanks. These tanks are worked on at least once a year (e.g. welded, repaired, etc.), and a resin coating would have to be stripped off to facilitate the work inside the tank. Toxic or caustic or heated resin removers or strippers are not practical in this context; hence, the protective coating on the metal should be readily removable with a relatively harmless de-greasing solvent.

Accordingly, one important aspect of corrosion inhibition technology has been the search for an organic material which provides good protection for the metal and yet is easily removed by unheated solvents of relatively low toxicity.

There is a wealth of patent and scientific literature regarding oil-based corrosion-inhibiting coating compositions which do not form a permanent, hard-to-strip coating. Some of these compositions are paint-like in nature and form a tough skin, while others may remain liquid. As representative of the U.S. patent literature, see the following patents: U.S. Pat. Nos. 2,421,672 (Wilson) and 3,035,926 (Larrieu). Other U.S. patents of interest include: U.S. Pat. Nos. 1,630,101; 2,128,523; 2,348,715; 2,421,672; 2,796,353; 3,033,808; 3,137,583; and 3,260,609.

In recent years, great strides have been made in improving the water-impermeability of stripable or removable rust proofing coatings for metal. A class of inorganic-organic complexes has been developed for forming a layer of overlapping fish scale-like crystals. The crystals can be more effective than hydrocarbon oils and the like in providing a moisture barrier. One type of composition using this technology comprises a gel-like thixotropic alkaline earth metal sulfonate and a coating material comprising a petroleum resin or wax or the like, all distributed throughout a hydrocarbon solvent. The alkaline earth metal sulfonate has a very peculiar inorganic-organic nature, due to the fact that it is "over based", i.e. neutralized with greater than the stoichiometric amount of an alkaline earth salt, e.g. calcium carbonate. One such product is available under the trademark "SACI" 300; for a similar type of composition, see U.S. Pat. No. 3,565,843 (Kassinger), issued Feb. 23, 1971. (SACI is a trademark of the Continental Oil Company.) Another type of SACI rust preventative concentrate is a grease-like material commercially designated SACI 200. However, oil-type rust preventatives based on SACI 200 are recommended for use as interior protective coatings only. For a detailed description of the organic-inorganic complex obtained by over-neutralizing an organic sulfonic acid with an alkaline earth or alkali metal base, see U.S. Pat. No. 3,452,124 (Wurstner), issued July 1, 1969. The Wurstner patent also contains a discussion of the colloidal system obtained by dispersing the organic-inorganic complex in an oily carrier or dispersant such as the alkyl, cycloalkyl, and aryl hydrocarbons and liquid petroleum fractions.

Unfortunately, it has proved difficult to take full advantage of the so-called "overbased" sulfonate rust-inhibiting concentrates. These concentrates and dispersions containing them are removed from the metal too easily. Furthermore, any disturbance of the coating on the metal can interfere with the overlapping relationship of the complex, fish scale-like crystals, thus significantly reducing the effectiveness of the moisture barrier. In any event, salt spray tests indicate that substantial corrosion of the metal substrate begins to occur as early as two or three days after coating the metal and commencing the test (e.g. the test specified by Mil-Spec MIL-R-21006). Attempts have been made to improve the salt spray resistance of the coating of organicinorganic complex with more than a dozen organic water-incompatible agents, but none of these agents seem to significantly improve the test results.

Accordingly, this invention contemplates a corrosion inhibiting or corrosion preventing composition which greatly improves the effectiveness of the aforementioned organic-inorganic complexes.

DEFINITIONS

The following terms are used repeatedly in this application and should be understood to have the following meanings:

"Drying oil" refers to oily organic liquids or unsaturated fatty oils which, when applied to a surface in the form of a thin film, readily absorb oxygen from the air and from tough, elastic substances by "drying", i.e. by hardening or solidifying through oxidative reactions, probably involving attack by the oxygen of air on the unsaturated sites in the drying oil molecules. It is currently believed that the "drying" process involves polymerization of the conjugated diene or triene groups by way of Diels-Alder type addition. Drying oils typically belong to the "linolenic acid group" of triglyceride esters. That is, the acids obtained by hydrolyzing these oils or glyceryl esters typically comprise a mixture of aliphatic unsaturated carboxylic acids including at least some linolenic acid or some similar $C_6$–$C_{24}$ carboxylic acid. Some of the aliphatic carboxylic acids can be saturated, and the unsaturated acids usually contain an alkenyl, alkadienyl, or alkatrienyl radical, e.g. a conjugated triene radical. Most of the acids are in the $C_{12}$–$C_{18}$ range, particularly the $C_{16}$ and $C_{18}$ acids. Synthetic drying oils are known, but the most common drying oils are natural products obtained from soybean, candle nut, linseed, hemp, grapefruit seed, orange seed, English walnut, wheat germ, and any of the usual tung oil sources. Drying oils are also obtained from fish oils and dehydrated castor oils. As will be explained subsequently, the preferred drying oil is tung oil.

"Hydrocarbon oil diluent" refers to predominantly hydrocarbonaceous, relatively high molecular weight liquids typically obtained from petroleum, coal tar, or the like. These liquids can comprise aliphatic, cycloaliphatic, or aromatic materials. For diluting the grease-like SACI materials described previously, the chlorinated hydrocarbons are considered equivalent to the petroleum or coal tar-derived parent compounds and are therefore included within the scope of the term "hydrocarbon" for purposes of this invention. Among these hydrocarbon materials are the paraffinic oils (which comprise mostly saturated straight chain hydrocarbons and a small amount of unsaturated compounds) and the naphthenic oils (which contain a large percentage of cycloaliphatics such as cyclopentane and cyclohexane and their derivatives). These oils preferably have a boiling range above 150°C., e.g. 175°C or higher and are preferably lower in viscosity than the typical commercially available grease-like concentrates of "the inorganic-organic complex".

"The inorganic-organic complex" refers to the combination of a sulfonate salt and an alkaline inorganic metal salt, whereby the crystalline structure of the inorganic portion of the complex is platelet and film-forming in character. Typical examples of such inorganic-organic complexes are the over-neutralized or "overbased" sulfonates described in the aforementioned U.S. Pat. Nos. to Wurstner (3,453,124) and kassinger et al. (3,565,843). As will be apparent from these patents and the trade literature of Continental Oil Company regarding SACI (trademark), the complexes are available in a variety of dispersion formulas and concentrations, but not generally as the complex per se.

SUMMARY OF THE INVENTION

It has now been discovered that the combination of a drying oil and a grease-like concentrate comprising the inorganic-organic complex, in certain selected proportions, can be more effective than the concentrate alone or the drying oil alone. Comparison tests indicate that the drying oil/inorganic-organic complex concentrate combination is more effective than either component alone by a factor of 2 or more (e.g. a factor of 5 to 10). The proportions selected for this invention are as follows:
 a. about 10 to about 30% by weight of a grease-like concentrate comprising the inorganic-organic complex stably dispersed in less than 4 parts, per part of said complex, of an essentially inert liquid oily phase (e.g. a hydrocarbon oil diluent); and
 b. about 2 to about 10% by weight of a drying oil.

The balance of the composition comprises a hydrocarbon oil diluent, which can be the same as or different from the inert liquid oily phase of the grease-like concentrate. Stated another way, the principal active ingredients of the composition comprise a viscous inorganic-organic concentrate and the drying oil in the ratio of about 1.3:1 to about 6:1 (preferably not more than 4:1), with enough diluent to reduce the viscosity level for coating (e.g. flotation coating) purposes. One preferred viscosity level is 50 – 300 centipoise (cps) at 23°C. The viscosity level is preferably selected so as to permit deposition of at least 1.0, preferably at least 5.5 grams of active ingredients, per square meter of metal to be protected, through flotation coating procedures; whereby, after drying of the coating (a process analogous to the drying of paint), a dry, solid coating with a minimum thickness greater than about 5 microns (0.2 mil) is generally obtained. Coatings, with a generally uniform thickness up to about 125 microns can be obtained, if thicker coatings are needed.

Although waxes, finger print removing solvents, and the like can be included in the composition, they are not preferred in the context of this invention. When tung oil is used as the drying oil component, it is also unnecessary to include "dryers", i.e. chemical additives used to accelerate the drying period of drying oils. If other drying oils such as linseed oil are used, it is preferred to include a dryer. Thixotropes and thickeners can also be included in the composition; however, for most uses, the inorganic-organic complex provides sufficient thixotropy. For protecting ferrous metals against rust, the preferred proportions are 12.5 to 25% by weight of the grease-like concentrate, 3 – 9% by weight of tung oil (or other suitable drying oil), and at least 60% by weight of a hydrocarbon oil diluent for the grease-like concentrate. If the grease-like concentrate has already been diluted with hydrocarbon oil or the like, a composition of this invention can be obtained by adding about 2 to about 10 parts by weight of the drying oil for each 100 parts by weight of the diluted concentrate.

It is ordinarily preferred to exclude pigments and organic polymeric dispersoids and emulsoids (e.g. latex solids) from the composition, so that users of the composition will not assume that it is a paint which can be applied with a paint brush. Brushing or wiping of the composition appears to interfere with the orientation of the protective platelets of inorganic-organic complex; hence the preferred methods of application are float coating and spraying.

Since a typical grease-like concentrate of the inorganic-organic complex contains more than 25% by weight and typically 50 –70% by weight of the complex per se, the proportions used in this invention can be restated as follows:
 a. about 5 to about 15% by weight of the inorganic-organic complex;
 b. about 2 to about 10% by weight of the drying oil; and
 c. essentially the balance to 100% (e.g. at least 75% by weight) of hydrocarbon oil diluent.

The active ingredients, expressed in this manner, are in a complex/drying oil ratio of about 1:1 – 3:1. Dilution of the active ingredients to, for example, the 50 – 300 cps level permits deposition of at least about 1.0 gram of these active ingredients per square meter of metal to be protected.

DETAILED DESCRIPTION OF THE INVENTION

The inorganic-organic complexes, the drying oils, and the hydrocarbon oil diluents used in this composition will now be described in detail.

INORGANIC-ORGANIC COMPLEXES AND CONCENTRATES CONTAINING THEM

As will be apparent from the preceeding discussion regarding inorganic-organic complexes, the preferred complexes can be characterized as over-neutralized salts of organic sulfonic acids. These over-neutralized or "overbased" salts can be characterized by the following structural formula:

$$(RSO_3)_m \cdot M \cdot aM_xX_m$$

Wherein

R represents an alkyl-aryl group, e.g. $C_{22}H_{45}PH$—(wherein —PH— represents phenylene);

M represents a metal of valence $m$;

$m$ represents the valence of M and is preferably an interger ranging from 1 to 4, more typically 1 or 2;

X represents a basic anion having a valence of $x$;

$x$ represents the valence of X and is typically an integer ranging from 1 to 3; and $a$ represents the excess over stoichiometry, in equivalents, for the basic salt $M_xX_m$. Accordingly, $a$ is greater than 0 and preferably greater than 1. As is shown by U.S. Pat. No. 3,453,124 (Wurstner) values for $a$ of 3 or 4 are not unusual and values of about 8 or more are permissible.

The inorganic-organic complexes are available in grease-like concentrates wherein the inorganic-organic complex has been stably dispersed in an inert oily diluent. The amount of inorganic-organic complex in these concentrates is said to amount to at least 25% by weight and more typically 50 – 70% by weight. Accordingly, the amount of oily diluent is typically about 65 – 100 parts per 100 by weight, based on the weight of the complex. However, since the order of addition of ingredients making up a composition of this invention is not critical, dilution of the inorganic-organic complex/dispersant component to levels approaching actual use levels of this invention (e.g. about 10 – 15% by weight of the complex per se dispersed in oil) can be carried out prior to the addition of the drying oil. Thus, a diluted concentrate containing, say, 85% hydrocarbon oil can be used without substantial modification in this invention.

The preferred rust-preventative concentrate consists essentially of a grease-like dispersion of the inorganic-organic complex in oil and has the following physical and chemical properties:

Specific gravity at 60°F.: 0.983g/cc

Brookfield viscosity (No. 6 spindle at 10 rpm): 55,000 centipoise

Flash point, PMCC ASTM Test D-93: 325°F.

Melting point: 550°F.

"Non-volatiles" (Federal Standard 141A Method 4041.1): 100 wt.%

Sulfated ash, ASTM Test D-874: 24.5%

This product, commercially designated SACI 200 (trademark) is very polar and thixotropic. It is compatible with aromatic, aliphatic, or chlorinated hydrocarbons commonly used as diluents. The amount of inorganic-organic complex dispersed in the oil is believed to be about 60% by weight, and the complex is believed to be the calcium sulfonate/calcium carbonate type having the formula $(RSO_3)_2Ca \cdot aCaCo_3$, wherein R and $a$ have the significance indicated previously. Although SACI 200 is recommended for use in interior protective coatings only, it is preferred for outdoor use in the context of this invention. The related outdoor product, SACI 300, is less preferred in this invention, due to its lower flash point.

In the preferred embodiments of this invention, the amount of SACI 200 is ordinarily at least 12.5% by weight and generally not more than 25% by weight. Optimum rust inhibition is obtained at a concentration level of at least about 15% by weight of the SACI. Concentrations above about 20% by weight are not necessary for meeting even the very exacting requirements of the salt spray test devised by the Bureau of Ships of the U.S. Navy, i.e. test MIL-R-21006. For smooth metal, even the aforementioned lower concentrations of the SACI appear to provide sufficient protection for ferrous metals to meet military specification MIL-R-21006.

DRYING OILS

As pointed out previously, the preferred drying oil is tung oil. Although tung oil itself or tung oil in combination with various hydrocarbons does not provide protection for ferrous metals adequate to meet the requirements of the aforementioned military specification, properly selected proportions of tung oil in combination with the inorganic-organic complex in a suitable diluent provided protection which meets or even exceeds these requirements. It has been found that very small amounts of tung oil (e.g. less than 2% by weight of the corrosion inhibiting composition) do not appear to add significantly to the protection provided by the inorganic-organic complex itself. On the other hand, large amounts of the tung oil (e.g. more than 10% by weight) may even detract from the protection provided by the complex. This latter phenomenon appears to be caused by excessive cracking tendencies imparted by the high concentration of the tung oil. Although this invention is not bound by any theory, it is believed that the tung oil forms a tough, flexible skin which seals the inorganic-organic complex crystals in the proper flat-layer relationship along the surface of the metal. Too small a concentration of tung oil or other drying oil does not form an adequate skin, while too much of the drying oil apparently leads to the formation of cracks in the skin and perhaps even disturbance of the flat layer of crystals. From 3 to 9% by weight of drying oil is adequate for most compositions of this invention, 6 – 8% by weight being preferred. On a parts per hundred basis, the 3 – 9% range is, for purposes of this invention, about equivalent to 3 – 9 phr.

Adequate results have been obtained with similar proportions of other drying oils such as linseed oil. However, it is preferred to combine the linseed oil with a "drier". As is known in the art, the typical driers are soaps or carboxylic acid salts of metals (e.g. Co, Mn, Pb, Cr, Ni, Zn, and other metals having a valence of 2 –7), e.g. linoleates, naphthenates, resinates, etc.

Other drying oils and combinations of drying oils with suitable dryers will occur to those skilled in the art.

HYDROCARBON OIL DILUENTS

The preferred diluents used in this invention are the paraffinic oils and the naphthenic oils, which generally boil over a range of temperatures and do not have sharp boiling points. The boiling range for, for example, kerosene is typically about 175°– 325°C. Higher boiling paraffinic and naphthenic oils have boiling ranges starting at about 250°C., e.g. 260°C. or more. Naphthenic oils tend to be slightly less expensive and are presently preferred. Commercially available concentrates of the inorganic-organic complex typically already contain 40% by weight or more of one of these petroleum- or coal tar-derived oils.

CORROSION INHIBITING COMPOSITIONS AND METHODS OF APPLICATION

Accordingly, the most preferred rust-inhibiting liquid coating composition of this invention consists essentially of:

15 – 20 parts by weight of the grease-like concentrate of the inorganic-organic film-forming, micelle-forming complex (e.g. a concentrate having a viscosity in excess of 50,000 cps at 25°C.);

6 – 8 parts by weight of tung oil; and essentially the balance of the composition, e.g. from about 72 to about 79 parts by weight, of a hydrocarbon oil such as naphthenic oil as a diluent for the grease-like concentrate and the tung oil.

This composition can be obtained by blending the ingredients in virtually any order of addition. The most convenient method of preparation is to start with the grease-like concentrate (rather than obtaining the inorganic-organic complex in essentially pure form), since the concentrates are the common commercially available form of the complex. The drying oil (e.g. tung oil) can be added directly to the concentrate or, more preferably, blended with the hydrocarbon oil diluent prior to adding the diluent to the concentrate. The addition of the diluent and the drying oil does not appear to change the fundamental phase relationship existing in the concentrate. That is, the inorganic-organic complex remains stably dispersed through the liquid dispersant phase comprising drying oil and diluent oil. (The drying oils are typically miscible in hydrocarbon liquids in any proportions and can form a single dispersant phase with such liquids.)

The preferred method for applying a composition of this invention is to deposit the composition on metal surfaces with essentially zero shear force applied to the area of deposition. That is, brushing, wiping, and the like are preferably avoided, since any shear force applied to the resulting coating can disorient the crystals of the inorganic-organic complex, leading to discontinuities in the fish scale-like film of crystals on the surface of the metal. The most efficient means for depositing a coating of the proper thickness without applying shear force to the deposited material is "float coating" or "flotation coating". Spraying is another suitable technique.

Flotation coating is a well-known method for coating the inside of tanks, e.g. ballast tanks for ships, barges, off shore oil rigs, etc. The tank is filled with water, the lighter-than-water corrosion-inhibiting composition is poured onto the surface of the water, and the water is then drained from the tank. The floating layer of anti-corrosion agent deposits on the side walls and bottom of the tank as the water drains out.

In a method of application according to this invention, the resulting coating contains a drying oil which absorbs oxygen from the air and dries to a solid, resinous, protective layer over the layer of inorganic-organic complex. When the drying oil concentration is selected according to the teachings of this invention, the resulting solid protective layer is soft rather than brittle and has little or no tendency to crack. The entire anti-corrosion layer (including solidified drying oil and inorganic-organic complex and any retained hydrocarbon diluent) is easily stripped off with unheated, relatively non-toxic degreasing solvents.

The following Examples illustrate the principle and practice of this invention. The grease-like concentrate of inorganic-organic complex used in these Examples was either SACI 200 (trademark) or SACI 300 (trademark), which have been described in detail previously and will simply be referred to by trademark designation in the text of the Examples. Unless otherwise indicated, all amounts or percentages are by weight. Evaluation of the compositions produced according to these Examples was in accordance with standard tests such as the saltspray test outlined in Military Specification MIL R-21006 (Bu-SHIPS) Amendment 2, Apr. 3, 1959.

EXAMPLE 1

The following ingredients were blended in the amounts indicated:

| Ingredient | Weight-% |
| --- | --- |
| Naphthenic Oil | 79 |
| Tung Oil | 6 |
| "SACI" 200* | 15 |
| TOTAL | 100 |

*Trademark of Continental Oil Company; Inorganic-organic complex described previously.

In blending this composition, the tung oil and naphthenic oil were mixed together and used to dilute the SACI 200. The performance of this composition and all other compositions described in these Examples is given in Table I, below.

EXAMPLE 2

The formulation of this Example was identical with that of Example I, except that 15 parts by weight of SACI 300 were used in place of the 15 parts of SACI 200. The SACI 300 is an essentially similar concentrate, except that it contains some wax and a low flash point solvent.

EXAMPLE 3

The formulation of the Example was as follows:

| Ingredient | % By Weight |
| --- | --- |
| Naphthenic Oil | 74 |
| Tung Oil | 6 |
| "SACI" 200* | 20 |
| TOTAL | 100 |

*See Example 1.

EXAMPLE 4 – 16

The purpose of these Examples was to test variations of the Example 1 formulation.

The formulations for these Examples are set forth in the following Table:

| Example | Naphthenic Oil | "SACI" 200* | Tung Oil |
| --- | --- | --- | --- |
| 4 | 84.5 | 12.5 | 3 |
| 5 | 87.5 | 7.5 | 5 |
| 6 | 89.5 | 7.5 | 3 |
| 7 | 85.5 | 11.5 | 3 |
| 8 | 86.5 | 10.5 | 3 |
| 9 | 87.5 | 9.5 | 3 |
| 10 | 88.5 | 8.5 | 3 |
| 11 | 97.0 | 0 | 3 |
| 12 | 95.0 | 0 | 3 |
| 13 | 75.0 | 0 | 25 |
| 14 | 75.0 | 5.0 | 20 |
| 15 | 65.0 | 5.0 | 30 |
| 16 | 75.0 | 15.0 | 10 |

*See Example 1.

EXAMPLES 17 – 19

In these Examples, SACI 300 was used in place of SACI 200, thereby testing variations of the Example 2 formulation. The formulations for these Examples were as follows:

| Example | Ingredient In Per Cent By Weight | | |
|---|---|---|---|
| | Naphthenic Oil | "SACI" 300* | Tung Oil |
| 17 | 82.5 | 12.5 | 5 |
| 18 | 84.5 | 12.5 | 3 |
| 19 | 85.0 | 10.0 | 5 |

*See Example 2.

EXAMPLES 20 – 25

In the following Examples, linseed oil or linseed oil plus No. 1 Japan drier (O'Brien Corp., South Bend, Indiana) was substituted for tung oil. The particular Japan drier used comprised a blend of Pb, Mn, and Co naphthenate in an aliphatic hydrocarbon solvent base. The formualtions were as follows:

| Example | Ingredient in Per Cent By Weight | | | |
|---|---|---|---|---|
| | Naphthenic Oil | "SACI" 200* | Linseed Oil | Drier |
| 20 | 79.0 | 15.0 | 6.0 | 0 |
| 21 | 74.0 | 20.0 | 6.0 | 0 |
| 22 | 78.0 | 15.0 | 6.0 | 1.0 |
| 23 | 77.0 | 15.0 | 6.0 | 2.0 |
| 24 | 73.0 | 20.0 | 6.0 | 1.0 |
| 25 | 72.0 | 20.0 | 6.0 | 2.0 |

*See Example 1.

EXPERIMENTAL CONTROLS

The following four Control Formulations were prepared for purposes of comparison. None of these control formulations contained any tung oil.

| Control | Naphthetic Oil, Weight % | "SACI" 200* Weight % |
|---|---|---|
| C-1 | 75 | 25 |
| C-2 | 82 | 18 |
| C-3 | 87.5 | 12.5 |
| | | "SACI" 300** Weight % |
| C-4 | 87.5 | 12.5 |

*See Example 1
**See Example 2

TEST RESULTS

In accordance with Military Specification MIL R-21006, a saltspray test was conducted on sand-blasted panels. The solution for the saltspray was 5% sodium chloride maintained at 100°F. The panels used for the saltspray test were 2 in. × 4 in. × ⅛ in. sand blasted QQS-636 open hearth, cold finished, dead soft temper, low carbon steel. The panels were hung in a 20% saltspray humidity cabinet for 15 days. After the panels were removed, they were weighed, de-greased, de-rusted, and weighed again. (The weight loss can be converted to the estimated mils of penetration per year.)

A test simulating ballast tank conditions was also conducted. The results of this test correlated with the saltspray test. In the simulated ballast tank test, 3.4 in. × 3 in. × 1/16 in. sand blasted QQS-636 panels and three prerusted panels were submerged for 24 hours and suspended above synthetic sea water for 24 hours on alternating days for a period of 12 weeks at 95°F. In this test, the mils/year penetration rate calculated out to 0.0 for the composition of Example 3. This performance indicates more than rust inhibition; it is tantamount to rust prevention.

The following table sets forth the results of the saltspray test for the four controls and for Examples 1 – 25. As will be apparent from the data in the table, the best performance was provided by Examples 1, 2, 3, and 25. Improved performance with respect to many commerically available anti-corrosion products is shown by Examples 4, 7, 8, and 21 – 24. The point of "failure" in the saltspray test was determined visually. The test for Example 3 was carried out well beyond the 15-day (360 hour) specification of MIL R-21006.

Table I

| Example | Saltspray Test Hours In Saltspray Before Failure |
|---|---|
| C-1 | 48 |
| C-2 | 35 |
| C-3 | 24 |
| C-4 | 22 |
| 1 | 360 |
| 2 | 360 |
| 3 | 500 |
| 4 | 104 |
| 5 | 43 |
| 6 | 43 |
| 7 | 66 |
| 8 | 64 |
| 9 | 60 |
| 10 | 41 |
| 11 | 3 |
| 12 | 3 |
| 13 | 24 |
| 14 | 5 |
| 15 | 6 |
| 16 | 28 |
| 17 | 104 |
| 18 | 87 |
| 19 | 55 |
| 20 | 72 |
| 21 | 82 |
| 22 | 80 |
| 23 | 160 |
| 24 | 208 |
| 25 | 232 |

What is claimed is:

1. A corosion-inhibiting composition comprising:
   a. about 10 to about 30% by weight of a rust-inhibitive, grease-like concentrate comprising a thixotropic inorganic/organic complex stably dispersed in an essentially inert liquid oily phase in an amount not to exceed 4 parts, per part of said complex, of said essentially inert liquid oily phase, said inorganic-organic complex comprising an over-based alkaline earth organic sulfonate salt, whereby the crystalline structure of the inorganic portion of said complex is platelet and film-forming in character;
   b. about 2 to about 10% by weight of a drying oil; said drying oil being miscible in a diluent oil selected from the group consisting of aliphatic hydrocarbon diluents, cycloaliphatic hydrocarbon diluents, aromatic hydrocarbon diluents, and mixtures thereof boiling at temperatures above 150°C.; and
   c. from at least 60% by weight to essentially the balance of said composition being a diluent oil selected from the group consisting of aliphatic hydrocarbon diluents, cycloaliphatic hydrocarbon diluents, aromatic hydrocarbon diluents, and mixtures thereof boiling at temperatures above 150°C.

2. A composition according to claim 1 wherein said drying oil comprises tung oil, and the amount of said tung oil is 3 – 9% by weight of said composition.

3. A composition according to claim 1 wherein said hydrocarbon oil diluent is a naphthenic oil.

4. A composition according to claim 1 consisting essentially of: a. 12.5 to 25% by weight of said rust-inhibitive, grease-like concentrate; and b. 3 – 9% by weight of tung oil; essentially the balance of said composition being naphthenic oil.

5. A composition according to claim wherein said rust-inhibitive grease-like concentrate comprises 50 – 70% by weight, based on the weight of said concentrate, of a film-forming, micelle forming, alkaline earth inorganic-organic complex of the formula $(RSO_3)_2Ca.aCaCO_3$, wherein R represents an alkyl-aryl group and $a$ is a number greater than zero and ranging up to about 8.

6. A composition according to claim 1 wherein the amount of said grease-like concentrate is about 15 to about 20% by weight of said composition.

7. A composition according to claim 1 wherein said drying oil is a glyceryl ester of a mixture of aliphatic carboxylic acids comprising unsaturated aliphatic carboxylic acids having from 6 to 24 carbon atoms.

8. A composition according to claim 2 wherein the ratio of $CaCO_3$ to $(C_{22}H_{45}-PhSO_3)_2$ Ca in the formula of said organic-inorganic film-forming complex is greater than zero and less than about 8.

9. A corrosion-inhibiting coating composition for a metal substrate consisting essentially of the following active ingredients: (a) an inorganic-organic complex consisting essentially of a compound of the formula $(RSO_3)_2Ca.aCaCO_3$, wherein R is an alkyl-aryl group and a is a number greater than zero ranging up to about 8, and (b) a drying oil, the ratio of (a) to (b) ranging from about 1:1 to 3:1, wherein said active ingredients have been diluted with an oily liquid and said oily liquid and said drying oil are sufficiently miscible to form a single phase, said oily liquid being selected from the group consisting of aliphatic, cycloaliphatic, and aromatic hydrocarbons and mixtures thereof derived from coal tar or petroleum and having a boiling range above 150°C., to a level of viscosity permitting the deposition, without shear, of at least about 1.0 gr. per square meter of substrate and a minimum of dry thickness coating of about 5 microns;
  wherein said corrosion-inhibiting coating composition comprises:
    about 5 to about 15% by weight of said inorganic-/organic complex;
    about 2 to about 10% by weight of said drying oil;
    and essentially the balance to 100% of said oily liquid.

10. A rust-inhibiting liquid coating composition consisting essentially of:
  a. 15 – 20% by weight of rust-inhibiting concentrate having a viscosity in excess of 50,000 c.p.s. at 25°C., said concentrate comprising a thixotropic, overneutralized $(C_{22}H_{45}-PhSO_3)_2Ca/CaCO_3$ organic-inorganic film-forming complex dispersed as micelles throughout an inert hydrocarbon oil phase having a boiling point above 260°C., wherein Ph represents a phenylene group and more than 25% by weight of said concentrate comprises said organic-inorganic filmforming complex;
  b. 6 – 8% by weight of tung oil; and
  c. essentially the balance of said composition, from about 72% to about 79% by weight, of naphthenic oil as a diluent for said components (a) and (b).

11. A composition according to claim 10 consisting of;
  a. about 15% by weight of said organic-inorganic filmforming complex;
  b. about 6% by weight of tung oil;
  c. about 79% by weight of naphthenic oil.

12. In a method for preparing a coating composition for protecting a metal surface through the formation of a coating comprising a generally water-impervious layer of crystalline metal salt platelets on said surface, said composition comprising an organic metal sulfonate/basic metal salt organic-inorganic complex dispersed in essentially hydrocarbon oil, the improvement which comprises:
  adding about 2 to about 10 parts by weight of a drying oil for each 100 parts by weight of said coating composition.

13. A method according to claim 12 wherein said drying oil is tung oil, and the amount of said tung oil used is greater than 3 but less than 9 parts per 100 parts of said coating composition.

14. A method of protecting metal surfaces against corrosion comprising the step of coating said surfaces with the composition of claim 1.

15. The method of claim 14, wherein said coating step is carried out by depositing said composition on said surfaces, with essentially zero shear force applies to the area of deposition.

16. The method of claim 15, wherein the combined amount of said grease-like concentrate and said drying oil deposited on said surfaces is at least about 1.0 gram per square meter for a minimum dry coating thickness of about 5 microns.

* * * * *